United States Patent
Laney et al.

(10) Patent No.: US 7,597,461 B2
(45) Date of Patent: *Oct. 6, 2009

(54) TENSIONED OPTICAL ELEMENT AND DISPLAY

(75) Inventors: Thomas M. Laney, Spencerport, NY (US); Bradley C. DeCook, Rochester, NY (US); David J. Cornell, Rochester, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/749,173

(22) Filed: May 16, 2007

(65) Prior Publication Data

US 2008/0192481 A1    Aug. 14, 2008

Related U.S. Application Data

(60) Provisional application No. 60/900,895, filed on Feb. 12, 2007.

(51) Int. Cl.
*F21V 11/00* (2006.01)
(52) U.S. Cl. .................. 362/355; 362/608; 362/618; 362/629; 349/58; 349/59; 349/60
(58) Field of Classification Search .......... 362/311, 362/608, 355, 618, 629, 632–634; 349/58–60, 349/161, 64; 385/11, 129–131, 141
See application file for complete search history.

(56) References Cited

U.S. PATENT DOCUMENTS

| 6,348,993 | B1 * | 2/2002 | Hori .......................... 359/443 |
| 7,327,415 | B2 * | 2/2008 | Brickey et al. .............. 349/64 |
| 2003/0123150 | A1 * | 7/2003 | Brickey et al. ............. 359/599 |
| 2006/0082699 | A1 | 4/2006 | Gehlsen et al. |
| 2006/0171164 | A1 | 8/2006 | Kida |
| 2006/0290253 | A1 * | 12/2006 | Yeo et al. ..................... 313/116 |
| 2008/0192482 | A1 * | 8/2008 | Laney et al. ................ 362/311 |
| 2008/0192503 | A1 * | 8/2008 | Laney et al. ................ 362/608 |

FOREIGN PATENT DOCUMENTS

| EP | 1 832 922 | 9/2007 |
| GB | 386 737 | 1/1933 |
| GB | 519 632 | 4/1940 |
| WO | WO 87/05711 | 9/1987 |

OTHER PUBLICATIONS

European Search Report of corresponding European Application No. EP 08 15 1288 mailed Feb. 25, 2009.

* cited by examiner

*Primary Examiner*—Stephen F Husar
*Assistant Examiner*—Meghan K Dunwiddie
(74) *Attorney, Agent, or Firm*—Edwin Oh

(57) ABSTRACT

An optical element comprises at least one optical film wherein at least a portion of the optical film is maintained dimensionally stable by the presence of a mechanism for application of a controlled tensile force to the film wherein the tensile force is applied through a tensioning mechanism protruding through holes or slots in the optical film.

5 Claims, 7 Drawing Sheets

TENSIONED OPTICAL ELEMENT AND DISPLAY

CROSS REFERENCE TO RELATED APPLICATIONS

This application claims the benefit of provisional U.S. Ser. No. 60/900,895 filed on Feb. 12, 2007.

FIELD OF THE INVENTION

The invention relates to a tensioned optical element and it use in optical displays, and more particularly to liquid crystal displays (LCDs) that may be used in LCD monitors and LCD televisions.

BACKGROUND OF THE INVENTION

Liquid crystal displays (LCDs) are optical displays used in devices such as laptop computers, hand-held calculators, digital watches and televisions. Some LCDs include a light source that is located to the side of the display, with a light guide positioned to guide the light from the light source to the back of the LCD panel. Other LCDs, for example some LCD monitors and LCD televisions (LCD-TVs), are directly illuminated using a number of light sources positioned behind the LCD panel. This arrangement is increasingly common with larger displays, because the light power requirements, to achieve a certain level of display brightness, increase with the square of the display size, whereas the available real estate for locating light sources along the side of the display only increases linearly with display size. In addition, some LCD applications, such as LCD-TVs, require that the display be bright enough to be viewed from a greater distance than other applications, and the viewing angle requirements for LCD-TVs are generally different from those for LCD monitors and hand-held devices.

Some LCD monitors and most LCD-TVs are commonly illuminated from behind by a number of cold cathode fluorescent lamps (CCFLs). These light sources are linear and stretch across the full width of the display, with the result that the back of the display is illuminated by a series of bright stripes separated by darker regions. Such an illumination profile is not desirable, and so a diffuser plate is used to smooth the illumination profile at the back of the LCD device.

Some LCD monitors and most LCD-TVs commonly stack an arrangement of light management films adjacent to the diffuser plate on the opposite side from the lamps. These light management films generally comprise collimating diffuser films, prismatic light directing films, and reflective polarizer films. Handling of these individual light management films to manufacture LCD displays is very labor intensive as some films are supplied with protective cover sheets which must be first removed and then each light management film placed in the back light unit of the LCD individually. Also, inventory and tracking of each film individually can add to the total cost to manufacture the LCD display. Further, as these light management films are handled individually there is more risk of damage to the films during the assembly process.

Currently, LCD-TV diffuser plates typically employ a polymeric matrix of polymethyl methacrylate (PMMA) with a variety of dispersed phases that include glass, polystyrene beads, and $CaCO_3$ particles. These plates are thick and heavy while display manufacturers are always trying to thin the form factor and reduce the weight of displays. The diffuser plates often deform or warp after exposure to the elevated humidity and high temperature caused by the lamps which causes viewing defects in the displays. In addition, the diffuser plates require customized extrusion compounding to distribute the diffusing particles uniformly throughout the polymer matrix, which further increases costs.

A previous disclosure, U.S. Pat. Application No. 2006/0082699 describes one approach to reducing the cost of diffusion plates by laminating separate layers of a self-supporting substrate and an optically diffuse film. Although this solution is novel the need to use adhesives to laminate these layers together results in reduced efficiency of the system by adding light absorption materials. Also the additional processing cost to laminate the layers together is self-defeating. Also, this previous disclosure does not solve the issue of the thick form factor and heavy weight of the diffuser plate. Nor does this solution address the issue of warping of the diffuser plate.

Another previous disclosure, US Pat. Application No. 2006/0171164 describes an optical film structure or element disposed between LC panel and a illumination source. This optical element uses film fixing parts attached to the optical films which are further attached to film tension controlling members which are connected to a frame. This disclosure describes the significant advantages of such an optical element in terms of preventing distortion of the optical films by maintaining tension on the films. One shortcoming of this disclosure, however, is that the use of film fixing parts as taught to connect the film tension controlling member to the film is very impractical in terms of a low manufacturing cost approach. The process of forming the film fixing parts and then attaching them to the optical films is a complex high cost means of providing a tensioning force to the optical films. Also, US Pat. Application No. 2006/0171164 does not teach how one could eliminate the thick plate diffuser by replacing it with a diffuser film that has equivalent optical performance.

It is desirable to replace the diffuser plate with an optical diffuser film, which would have a much thinner form factor as well as significantly lower weight. Such a diffuser film must have dimensional stability as well as high optical transmission while maintaining a high level of light uniformization. Further, it is desirable for such a diffuser film to have additional heat insulation value to reduce the heat gain from the light sources to the LC layer above the diffuser. Voiding is a well-known means to achieve both the optical requirements and the insulation requirements of the diffuser film.

The diffuser film must also provide the structural support for itself and optionally for the other optical films typically used in the light management arrangement. It is this structural support requirement that is the essence of the present invention.

Therefore, it the object of the present invention to provide an optical element comprising at least one optical film which is supported under a controlled tensile force by a tensioning mechanism such that the film maintains flatness and a high degree of tension over the design temperature and humidity ranges of the optical element. It is further the object of the present invention to provide a low cost means to provide the tension to the at least one optical film.

In a preferred embodiment the optical element provides the optical smoothing function of previous plate diffusers at a very low cost. The optical element is unique in that it provides a high level of optical function and meets surface flatness requirements under specified thermal and humidity testing even at low thicknesses. Typically the optical element comprises a supporting frame around the perimeter of the at least one optical film that is supported by a controlled tensile force. Other embodiments of the invention include other light management films also constrained by the supporting frame.

These other optical films can also be supported by a controlled tensile force or be supported by the at least one optical film that is supported by a controlled tensile force.

SUMMARY OF THE INVENTION

The invention provides an optical element comprising at least one optical film wherein at least a portion of the optical film is maintained dimensionally stable by the presence of a mechanism for application of a controlled tensile force to the film wherein the tensile force is applied through a tensioning mechanism protruding through holes or slots in the optical film. It also encompasses an optical element comprising at least one optical film wherein at least a portion of the optical film is maintained dimensionally stable by the presence of a mechanism for application of a controlled tensile force to the film wherein the optical film is a diffuser film that contains voids. It further encompasses an optical element comprising at least one optical film wherein at least a portion of the optical film is maintained dimensionally stable by the presence of a mechanism for application of a controlled tensile force to the film wherein the maximum change in applied tensile force for each mechanism is less than 50% of the highest force over the expected film dimensional change for the design temperature and humidity range of the optical element.

It also provides a display and a process for emitting light uniformly. One embodiment of this invention is an optical element comprising a polymeric optical diffuser film which is supported by a controlled tensile force via a frame around the perimeter of the film. The tensile force is applied to the film, for example, by spring type mechanisms which protrude through holes or slots at various locations around the perimeter of the film and are subsequently connected to the frame. These spring mechanisms substantially maintain a tension on the film even during environmental test conditions. This optical element is useful in replacing the optical function of diffuser plates typically used today in backlit LCD displays.

Another embodiment of this invention is an optical element comprising optical diffuser film and at least one other light management film at least one of which is supported by a controlled tensile force via tensioning mechanisms protruding through holes or slots in the film and connected to a frame around the perimeter of the film. This optical element is useful in replacing the optical function of diffuser plates and light management films typically used today in backlit LCD displays.

Another embodiment of the invention is directed to a liquid crystal display (LCD) unit that has a light source and an LCD panel that includes an upper plate, a lower plate and a liquid crystal layer disposed between the upper and lower plates. The lower plate faces the light source, and includes an absorbing polarizer. An optical element comprising an arrangement of light management films at least one of which is supported by a controlled tensile force via tensioning mechanisms protruding through holes or slots in the film and connected to a frame around the perimeter of the film is disposed between the light source and the LCD panel so that the light source illuminates the LCD panel through the arrangement of light management films.

The arrangement of light management films comprises a first polymeric optical diffuser film. The arrangement of light management films optionally comprises other optical layers. Other optical layers may include a bead coated collimating diffuser film, a light directing film and a reflective polarizer.

BRIEF DESCRIPTION OF THE DRAWINGS

The invention may be more completely understood in consideration of the following detailed description of various embodiments of the invention in connection with the accompanying drawings, in which.

Figure 1:
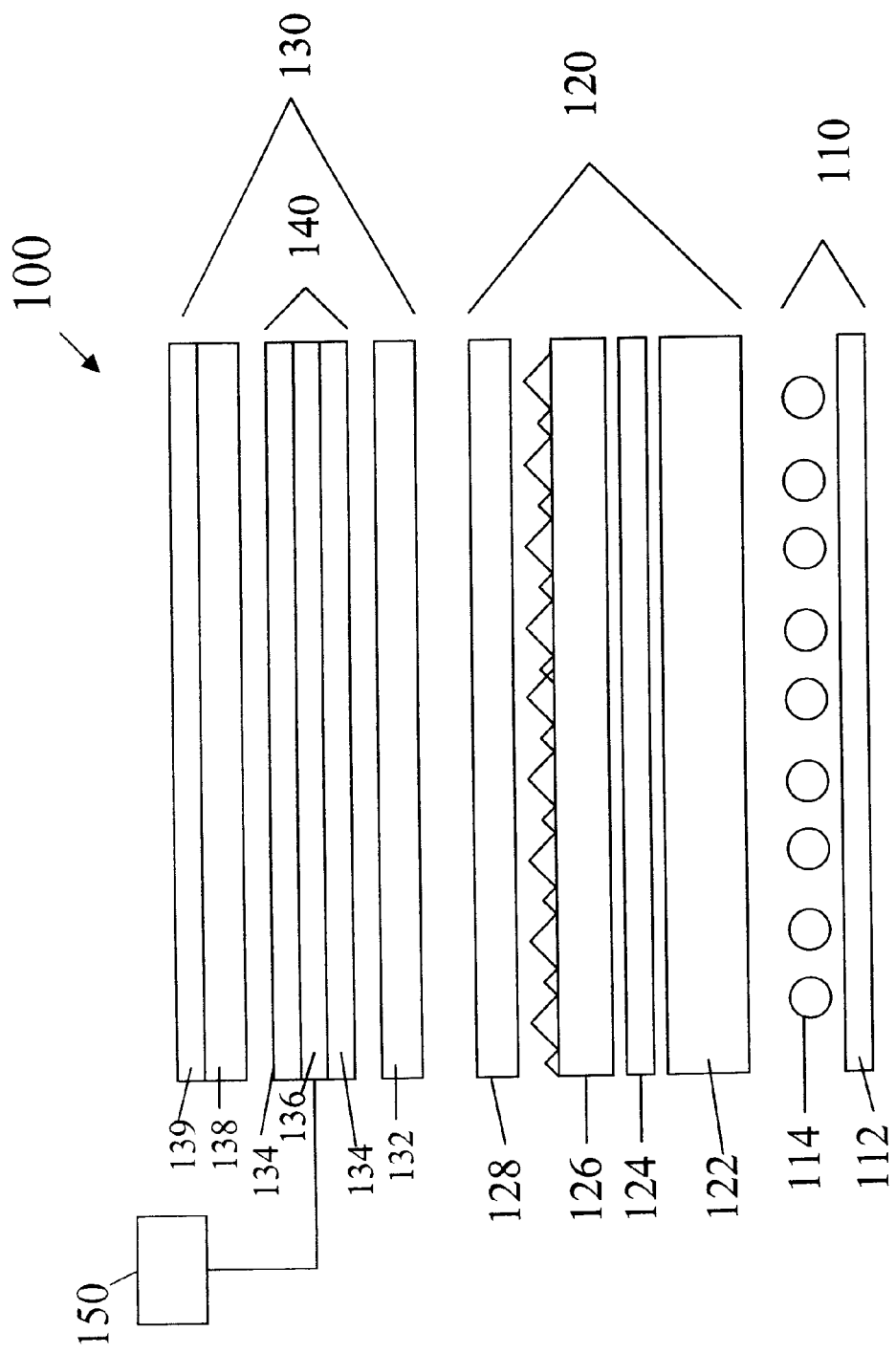
FIG. 1 schematically illustrates a typical back-lit liquid crystal display device that uses a diffuser plate.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the claims.

DETAILED DESCRIPTION OF THE INVENTION

The present invention is applicable to liquid crystal displays (LCDs, or LC displays), and is particularly applicable to LCDs that are directly illuminated from behind, for example as are used in LCD monitors and LCD televisions (LCD-TVs).

The diffuser plates currently used in LCD-TVs are based on a polymeric matrix, for example polymethyl methacrylate (PMMA), polycarbonate (PC), or cyclo-olefins, formed as a rigid sheet. The sheet contains diffusing particles, for example, organic particles, inorganic particles or voids (bubbles). These plates often deform or warp after exposure to the elevated temperatures of the light sources used to illuminate the display. These plates also are more expensive to manufacture and to assemble in the final display device.

The invention is directed to a directly illuminated LCD device that has an arrangement of light management films positioned between the LCD panel itself and the light source. The arrangement of light management films includes at least a polymeric optical diffuser film possessing a specific transmission and uniformization function which is supported by a controlled tensile force via tensioning mechanisms protruding through holes or slots in the film and connected to a frame around the perimeter of the film. Optionally other optical films such as bead coated collimating diffuser films, light directing films, and reflective polarizers can be constrained by the frame or by the tensioned film or films. The transmission and haze levels of each component are designed to provide a direct-lit LC display whose brightness is relatively uniform across the display.

Preferred polymeric optical diffuser films of the present invention are simple to manufacture and provide a high degree of flexibility in the materials and processes used in manufacturing. In the present invention, the structural and optical requirements are separated: the tensioning mechanism provides the structural performance and the thin diffusing film, provides the optical performance. By separating these functions, the cost advantages of using thin diffuser sheets can be exploited, to reduce overall costs. By not including a substrate with the diffuser film a high level of optical performance and a low manufacturing cost is realized. This also prevents any warping of thick plates as the tensioned film maintains a high degree of uniformity over the design temperature and humidity range. In addition, it is easier to control the diffusion properties more precisely when the diffuser is contained in a film rather than a substrate. By using a voided diffuser film an optimal optical performance as well as a higher level of insulation can be provided at any given thickness of the diffuser.

A schematic exploded view of an exemplary embodiment of a direct-lit LC display device 100 is presented in FIG. 1. Such a display device 100 may be used, for example, in an LCD monitor or LCD-TV. The display device 100 is based on the use of a front panel assembly 130, comprising a LC panel 140, which typically comprises a layer of LC 136 disposed between panel plates 134. The plates 134 are often formed of glass, and may include electrode structures and alignment layers on their inner surfaces for controlling the orientation of the liquid crystals in the LC layer 136. The electrode structures are commonly arranged so as to define LC panel pixels, areas of the LC layer where the orientation of the liquid crystals can be controlled independently of adjacent areas. A color filter may also be included with one or more of the plates 134 for imposing color on the image displayed.

An upper absorbing polarizer 138 is positioned above the LC layer 136 and a lower absorbing polarizer 132 is positioned below the LC layer 136. The absorbing polarizers 138, 132 and the LC panel 140 in combination control the transmission of light from the backlight 110 through the display 100 to the viewer. In some LC displays, the absorbing polarizers 138, 132 may be arranged with their transmission axes perpendicular. When a pixel of the LC layer 136 is not activated, it may not change the polarization of light passing therethrough. Accordingly, light that passes through the lower absorbing polarizer 132 is absorbed by the upper absorbing polarizer 138, when the absorbing polarizers 138, 132 are aligned perpendicularly. When the pixel is activated, on the other hand, the polarization of the light passing there through is rotated, so that at least some of the light that is transmitted through the lower absorbing polarizer 132 is also transmitted through the upper absorbing polarizer 138. Selective activation of the different pixels of the LC layer 136, for example by a controller 150, results in the light passing out of the display at certain desired locations, thus forming an image seen by the viewer. The controller may include, for example, a computer or a television controller that receives and displays television images. One or more optional layers 139 may be provided over the upper absorbing polarizer 138, for example to provide mechanical and/or environmental protection to the display surface. In one exemplary embodiment, the layer 139 may include a hardcoat over the absorbing polarizer 138.

It will be appreciated that some type of LC displays may operate in a manner different from that described above. For example, the absorbing polarizers may be aligned parallel and the LC panel may rotate the polarization of the light when in an unactivated state. Regardless, the basic structure of such displays remains similar to that described above.

The backlight 110 includes a number of light sources 114 that generate the light that illuminates the LC panel 120. The light sources 114 used in a LCD-TV or LCD monitor are often linear, cold cathode, fluorescent tubes that extend across the display device 100. Other types of light sources may be used, however, such as filament or arc lamps, light emitting diodes (LEDs), flat fluorescent panels or external fluorescent lamps. This list of light sources is not intended to be limiting or exhaustive, but only exemplary.

The backlight 110 may also include a reflector 112 for reflecting light propagating downwards from the light sources 114, in a direction away from the LC panel 140. The reflector 112 may also be useful for recycling light within the display device 100, as is explained below. The reflector 112 may be a specular reflector or may be a diffuse reflector. One example of a specular reflector that may be used as the reflector 112 is Vikuiti® Enhanced Specular Reflection (ESR) film available from 3M Company, St. Paul, Minn. Examples of suitable diffuse reflectors include polymers, such as polyethylene terephthalate (PET), polycarbonate (PC), polypropylene, polystyrene and the like, loaded with diffusely reflective particles, such as titanium dioxide, barium sulphate, calcium carbonate and the like.

An arrangement 120 of light management layers is positioned between the backlight 110 and the front panel assembly 130. The light management layers affect the light propagating from backlight 110 so as to improve the operation of the display device 100. For example, the arrangement 120 of light management layers may include a diffuser plate 122. The diffuser plate 122 is used to diffuse the light received from the light sources, which results in an increase in the uniformity of the illumination light incident on the LC panel 140. Consequently, this results in an image perceived by the viewer that is more uniformly bright.

The arrangement 120 of light management layers may also include a reflective polarizer 128. The light sources 114 typically produce unpolarized light but the lower absorbing polarizer 132 only transmits a single polarization state, and so about half of the light generated by the light sources 114 is not transmitted through to the LC layer 136. The reflecting polarizer 128, however, may be used to reflect the light that would otherwise be absorbed in the lower absorbing polarizer, and so this light may be recycled by reflection between the reflecting polarizer 128 and the reflector 112. At least some of the light reflected by the reflecting polarizer 128 may be depolarized, and subsequently returned to the reflecting polarizer 128 in a polarization state that is transmitted through the reflecting polarizer 128 and the lower absorbing polarizer 132 to the LC layer 136. In this manner, the reflecting polarizer 128 may be used to increase the fraction of light emitted by the light sources 114 that reaches the LC layer 136, and so the image produced by the display device 100 is brighter.

Any suitable type of reflective polarizer may be used, for example, multilayer optical film (MOF) reflective polarizers; diffusely reflective polarizing film (DRPF), such as continuous/disperse phase polarizers, wire grid reflective polarizers or cholesteric reflective polarizers.

The arrangement 120 of light management layers may also include a light directing film 126. A light directing film is one that includes a surface structure that redirects off-axis light in a direction closer to the axis of the display. This increases the amount of light propagating on-axis through the LC layer 136, thus increasing the brightness of the image seen by the viewer. One example is a prismatic light directing film, which has a number of prismatic ridges that redirect the illumination light, through refraction and reflection.

Unlike diffuser plates and stacked optical films used in conventional LCD-TVs, the present invention uses an arrangement of light management films at least one of which is supported by a controlled tensile force. Typically the controlled tensile force is provided via the use of a spring type mechanism with pins protruding through holes or slots in the film. Another means to provide the controlled tensile force is using tensioning straps as the spring type mechanism that protrude through holes or slots in the film.

The spring type mechanisms are further secured to a frame which located around the perimeter of the film. A "spring type mechanism" is defined here as any mechanism that can substantially maintain a uniform tensile force over a range of motion. That range of motion must be at least as large a distance as the maximum expected change in dimension of the film under the design temperature humidity ranges. Substantially maintained is defined here as maintaining the tensile force to at least 50% of the original force. Preferably the force can be maintained to at least 75% of the original force. The term film is defined here as a sheet of material that has a thickness of less than 500 um.

Figure 2:
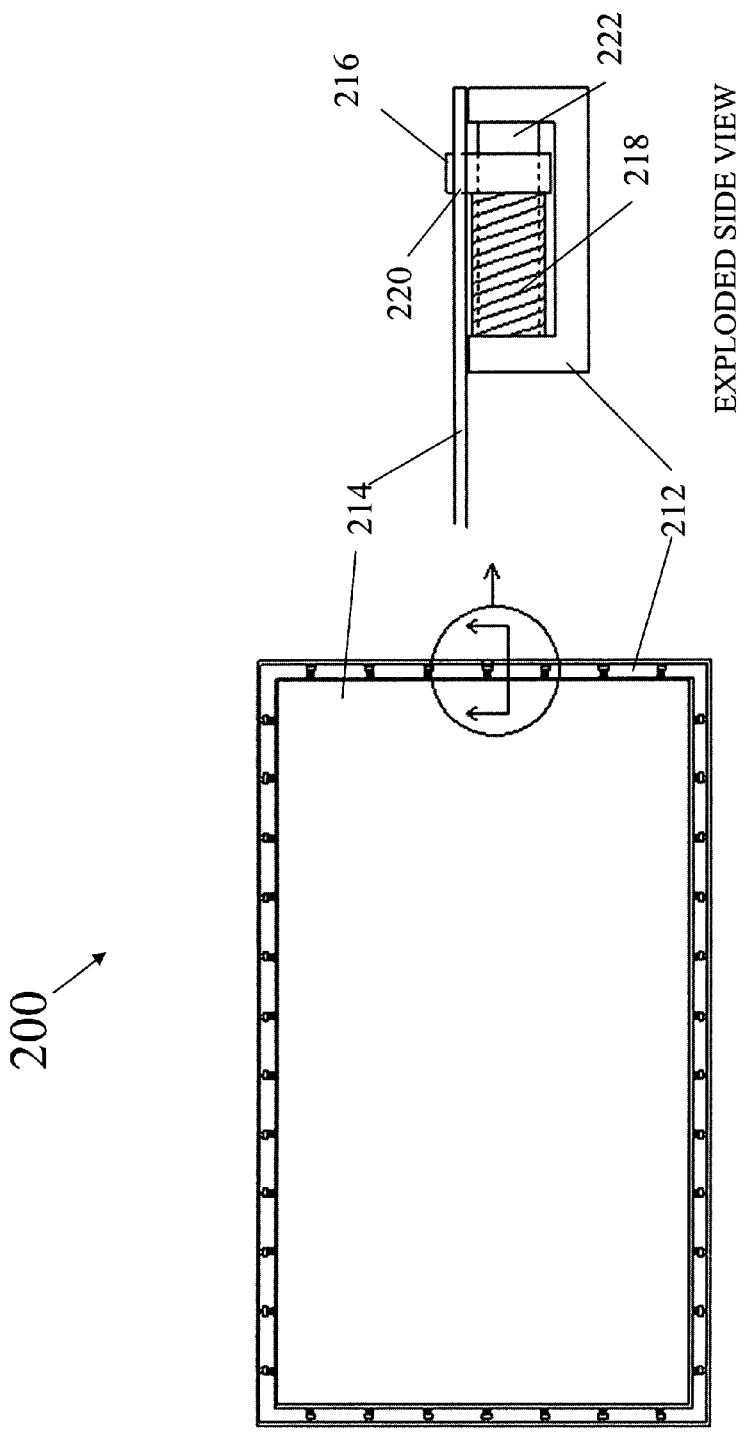
FIG. 2 schematically illustrates an optical element comprising a polymeric optical diffuser film, which is supported by a controlled tensile force via spring mechanisms protruding through holes or slots in the film and connected to a frame around the perimeter of the film according to principles of the present invention. Such an optical element capable of replacing the function of the diffuser plate of FIG. 1.

One exemplary embodiment of the optical element of the present invention is schematically illustrated in FIG. 2. The optical element 200 includes a polymeric optical diffuser film 214 and a supporting frame 212 located around the perimeter of the film. Perimeter is defined here as an imaginary continuous line drawn along all thin edges of the film. Typically for LDC displays there are 4 orthogonal edges creating a rectangular perimeter. Other optical films can also be added to the arrangement of light management layers above the polymeric optical diffuser film as will be illustrated in subsequent figures. FIG. 2 shows one means by which the optical diffuser film 214 is supported by a tensile force. A pin 216 protrudes through a slot 220 in the film. The pin has at least one surface that is normal to the direction of the tensile force. The pin 216 slides on a shaft 222. Shaft 222 is secured at both ends by the frame 212. The frame serves to help provide the tension as a fixed surface and also can help to form a surface to which the tensioned film is positionally forced to maintain by being somewhat pulled against the top surface of the frame. A spring 218, which also slides on shaft 222, is compressed against pin 216 resulting in a tensile force on the optical diffuser film 214 that is applied in a direction perpendicular to the edge of the film nearest the applied location. Many such spring type mechanisms are placed around the perimeter of the diffuser film 214 at various locations.

The tensioned optical diffuser film 214 is self-supporting. Here self-supporting is defined as maintaining a planar uniformity of the film under the films own weight plus the addition of the weight of any other optical films to be used in the light management arrangement. Planar uniformity is defined as having an out of plane deflection from original position of less than $180^{th}$ of the length of the longest side of the diffuser film.

The tensioned diffuser film 214 and one or more other light management layers may be included in a light management arrangement disposed between the backlight and the LCD panel. The tensioned diffuser film 214 provides a stable structure for supporting the light management arrangement. The tensioned film is not prone to warping like conventional diffuser plate systems.

Exemplary embodiments of the polymeric optical diffuser film 214 include a semi-crystalline polymer matrix containing voids and void initiating particles. A semi-crystalline polymer matrix is preferred as it may be substantially transparent to visible light, can be readily stretch voided, and can possess dimensional stability having a shrinkage of less than 1.0% after being tested at elevated temperatures up to 85 C. Preferable polymers to meet all these criteria are polyesters and their copolymers. Most preferred are poly(ethylene terephthalate) (PET); poly(ethylene naphthalate) (PEN)polyesters and any of their copolymers. PET is most suitable as it is much lower in cost than PEN.

The void initiating particles may be any type of particle that is incompatible with the matrix polymer. These particles can be inorganic or organic. Inorganic particles can include any of calcium carbonate, barium sulfate, titanium dioxide, or any other inorganic compound that can be melt blended into a polymer. Typical organic void initiating particles are polymers that are immiscible with the matrix polymer. These are preferred as resin pellets of these immiscible polymers can be simply dry blended with the resin pellets of the matrix polymer and extruded together to form a cast film. Inorganic particles require a pre-mixing or melt compounding, which adds processing cost. Preferred organic void initiating particles are polyolefins. Most preferred is polypropylene. The void initiating particles should be added so as to produce enough diffusivity to function as a diffuser yet not be so opaque that the optical luminance of the LCD display is significantly reduced. Preferred loadings of the void initiating particles are 3 to 25 wt % of the entire film. The most preferred loadings are 10 to 20 wt %.

The polymeric optical diffuser 214 is preferably produced by a process of dry blending the matrix polymer and an immiscible polymer additive. Blending may be accomplished by mixing finely divided, e.g. powdered or granular, matrix polymer and polymeric additive and, thoroughly mixing them together, e.g. by tumbling them. The resulting mixture is then fed to the film forming extruder. Blended matrix polymer and immiscible polymeric additive which has been extruded and, e.g. reduced to a granulated form, can be successfully re-extruded into a voided polymeric optical diffuser. It is thus possible to re-feed scrap film, e.g. as edge trimmings, through the process. Alternatively, blending may be effected by combining melt streams of matrix polymer and the immiscible polymer additive just prior to extrusion. If the polymeric additive is added to the polymerization vessel in which the matrix polymer is produced, it has been found that voiding and hence diffusivity is not developed during stretching. This is thought to be on account of some form of chemical or physical bonding which may arise between the additive and matrix polymer during thermal processing.

The extrusion, quenching and stretching of the voided polymeric optical diffuser film may be effected by any process which is known in the art for producing oriented film, e.g. by a flat film process or a bubble or tubular process. The flat film process is preferred for making voided polymeric optical diffuser according to this invention and involves extruding the blend through a slit die and rapidly quenching the extruded web upon a chilled casting drum so that the matrix polymer component of the film is quenched into the amorphous state. The film base is then biaxially oriented by stretching in mutually perpendicular directions at a temperature above the glass-rubber transition temperature of the matrix polymer. Generally the film is stretched in one direction first and then in the second direction although stretching may be effected in both directions simultaneously if desired. In a typical process the film is stretched firstly in the direction of extrusion over a set of rotating rollers or between two pairs of nip rollers and is then stretched in the direction transverse thereto by means of a tenter apparatus. The film may be stretched in each direction to 2.5 to 5.0 times its original dimension in each direction of stretching. Upon stretching voids initiate around the void initiating particles. The higher the concentration of void initiating particle the higher the degree of void volume that is produced. The final stretched thickness of the film is preferably in the 25.0 to 250.0 um thickness range. The most preferred thickness range is between 50.0 and 150.0 um. This is significantly thinner than the optically transmissive self-supporting substrate and together their total thickness can be maintained in the range of that of the currently used plate diffusers.

After the film has been stretched and a voided polymeric optical diffuser film formed, it is heat set by heating to a temperature sufficient to crystallize the matrix polymer whilst restraining the voided polymeric optical diffuser against retraction in both directions of stretching. This process enables the film to meet shrinkage requirements of less than 1.0% when tested at temperatures up to 85 C. The voiding tends to collapse as the heat setting temperature is increased and the degree of collapse increases as the temperature increases. Hence specular light transmission increases with an increase in heat setting temperatures. Whilst heat setting temperatures up to about 230 C can be used without destroying the voids, temperatures between 150 C and 200 C generally result in a greater degree of voiding and more efficient diffusivity, as well as result in low shrinkage after thermal testing.

The polymeric optical diffuser film 214 may also include a whitener. Typically whiteners are added at levels much lower than void initiators and thus do not contribute to voiding but do improve whiteness and to some extent diffusivity of the film. Whiteners are typically inorganic compounds, TiO2 being most preferred. These optical brighteners can be added to the film during the resin blending process and can be added via master batch pellets at the appropriate ratio. The appropriate ratio is that that would let down the concentration of the master batch pellet with the rest of the matrix resin and void initiating resin to a concentration preferably between 0.25 and 5.0 wt %.

The polymeric optical diffuser film 214 may also include optical brighteners that convert UV light into visible light. Such optical brighteners must be chosen from those which are thermally stable and can survive the extrusion temperatures used to fabricate the voided polymeric optical diffuser film. Preferred optical brighteners comprise benzoxazolyll-stilbene compounds. The most preferred optical brightener comprises 2,2'-(1,2-ethenediyldi-4,1-phenylene)bisbenzoxazole. These optical brighteners can be added to the film during the resin blending process and can be added via master batch pellets at the appropriate ratio. The appropriate ratio is that that would let down the concentration of the master batch pellet with the rest of the matrix resin and void initiating resin to a concentration preferably between 0.01 and 0.1 wt %. In the most preferred embodiment the optical brightener will be added to attain a concentration between 0.02 and 0.05% wt.

The polymeric optical diffuser film 214 may also include an antistatic coating to prevent dirt attraction. Anyone of the known antistatic coatings could be employed.

The polymeric optical diffuser film 214 may also be fabricated as a multilayered or coextruded film. Advantages of doing so would be to enable the use of a very thin film yet still meet both optical and thermal stability or shrinkage requirements. Thin films require high loadings of void initiator and thus high voiding to achieve the optical diffusion performance of a plate diffuser. At these high levels of voiding the film is much less dimensionally stable at elevated temperatures. By creating a film with a non-voided layer adjacent to one or both sides of a voided layer the dimensional stability at elevated temperatures can be improved. Such multilayered films are produced the same as previously discussed except a second extruder is used to melt and pump neat matrix polymer. This neat polymer extrusion flow is delivered along with the voided layer extrusion flow, previously described, into a co-extrusion die assembly. A multilayered cast film is then produced with a layer of neat polymer on one or both sides of the voided layer. This cast film is then quenched and stretched as previously discussed.

The optical diffuser film 214 may be provided with protection from ultraviolet (UV) light, for example by including UV absorbing material or material in one of the layers that is resistant to the effects of UV light. Suitable UV absorbing compounds are available commercially, including, e.g., Cyasorb® UV-1164, available from Cytec Technology Corporation of Wilmington, Del., and Tinuvin® 1577, available from Ciba Specialty Chemicals of Tarrytown, N.Y.

Other materials may be included in the optical diffuser film 214 to reduce the adverse effects of UV light. One example of such a material is a hindered amine light stabilizing composition (HALS). Generally, the most useful HALS are those derived from a tetramethyl piperidine, and those that can be considered polymeric tertiary amines. Suitable HALS compositions are available commercially, for example, under the "Tinuvin" trade name from Ciba Specialty Chemicals Corporation of Tarrytown, N.Y. One such useful HALS composition is Tinuvin 622.

The optical element 200 of FIG. 2 can be used in place of the diffuser plate of conventional LCD displays.

Figure 3:
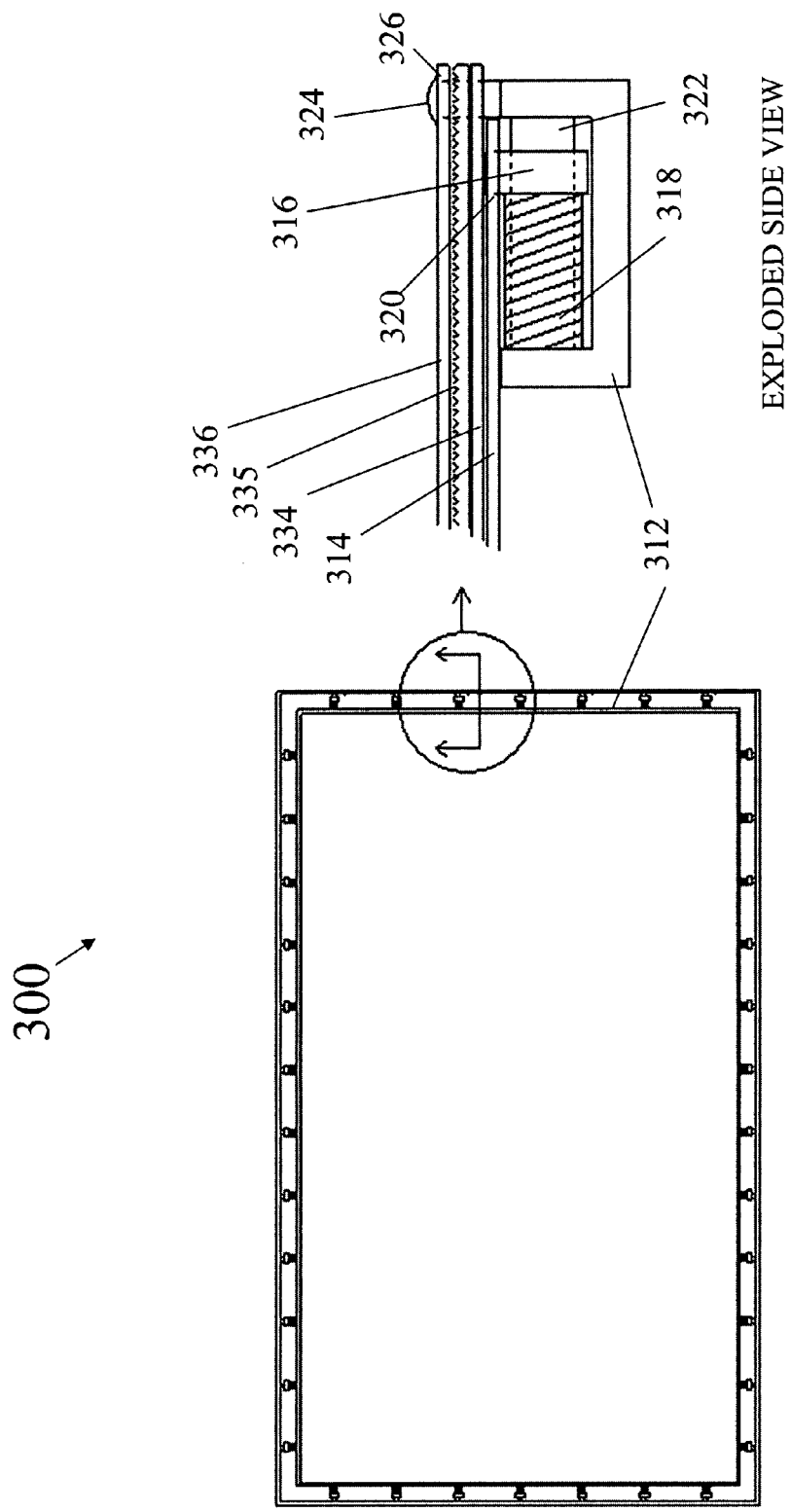
FIG. 3 schematically illustrates an optical element comprising an optical diffuser film, which is supported by a controlled tensile force via tensioning mechanisms protruding through holes or slots in the film and connected to a frame around the perimeter of the film according to principles of the present invention. Also, a bead coated collimating diffuser film, a light directing film, and a reflective polarizer film are constrained by the frame such that the optical element is a unitary component that comprises the entire light management film arrangement for an LCD display.

Another exemplary embodiment of the present invention is schematically illustrated in FIG. 3. The optical element 300 is an arrangement of light management films which includes a polymeric optical diffuser film 314 and a supporting frame 312 located around the perimeter of the film. Other optical films are also added to the arrangement of light management layers above the polymeric optical diffuser film. A bead coated collimation diffuser film 334 is placed adjacent to the polymeric optical diffuser film 314. A light directing film 335 is placed adjacent to the bead coated collimation diffuser film 334, opposite the optical diffuser film. A reflective polarizer film 336 is placed adjacent the light directing film 335, opposite the bead coated collimation diffuser film. FIG. 3 shows one means by which the optical diffuser film 314 is supported by a tensile force. A pin 316 protrudes through a slot 320 in the film. The pin has at least one surface that is normal to the direction of the tensile force. The pin 316 slides on a shaft 322. Shaft 322 is secured at both ends by the frame 312. A spring 318, which also slides on shaft 322, is compressed against pin 316 resulting in a tensile force on the optical diffuser film 314 that is applied in a direction perpendicular to the edge of the film nearest the applied location. Many such spring type mechanisms are placed around the perimeter of the diffuser film 314 at various locations. The tensioned optical diffuser film 314 is self-supporting. The other optical films 334, 335, and 336 are all constrained by the frame 312 via a pin 324 which protrudes through the films via slots 326. The optical element 300 of FIG. 3 can be used in place of the diffuser plate and the optional optical films of conventional LCD displays.

Figure 4:
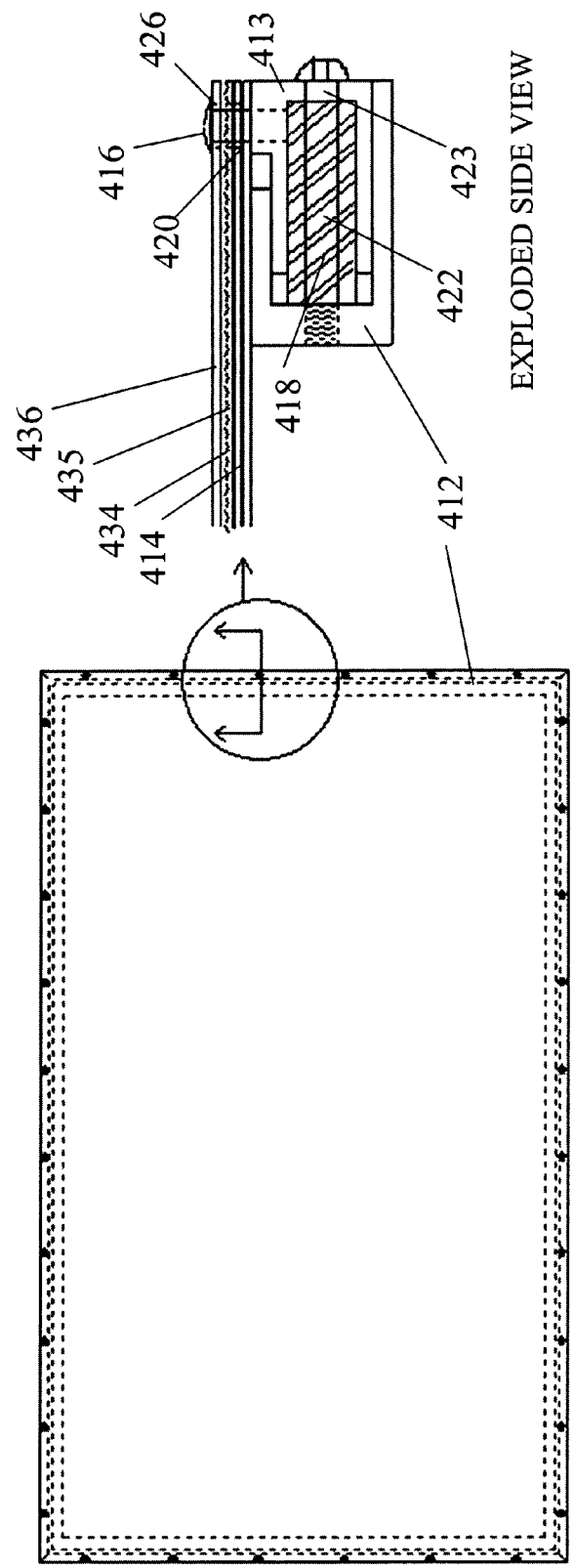
FIG. 4 schematically illustrates an optical element comprising an optical diffuser film, which is supported by a controlled tensile force via a sub-frame connected to a frame around the perimeter of the film via spring mechanisms according to principles of the present invention. Also, a bead coated collimating diffuser film, a light directing film, and a reflective polarizer film are constrained by the sub-frame such that the optical element is a unitary component that comprises the entire light management film arrangement for an LCD display.

Another exemplary embodiment of the present invention is schematically illustrated in FIG. 4. The optical element 400 is an arrangement of light management films which includes a polymeric optical diffuser film 414 and a supporting frame 412 located around the perimeter of the film. Other optical films are also added to the arrangement of light management layers above the polymeric optical diffuser film. A bead coated collimation diffuser film 434 is placed adjacent to the polymeric optical diffuser film 414. A light directing film 435 is placed adjacent to the bead coated collimation diffuser film 434, opposite the optical diffuser film 414. A reflective polarizer film 436 is placed adjacent the light directing film 435, opposite the bead coated collimation diffuser film 434. FIG. 4 shows an alternative means by which the optical diffuser film 414 is supported by a tensile force. A pin 416 protrudes through a slot 420 in the film. The pin has at least one surface that is normal to the direction of the tensile force. The pin 416 is fixed into a sub-frame 413, which slides on the inner surfaces of the frame 412. A shaft 422 slides into a hole 423 in the end of sub-frame 413. Shaft 422 is secured at one end by the frame 412. A spring 418, which also slides on shaft 422, is compressed against the inside surfaces of both the sub-frame 413 and the frame 412 resulting in a tensile force on the optical diffuser film 414 that is applied in a direction perpendicular to the edge of the film nearest the applied location. Many such pins as 416 are located on at least 4 different sub-frames 413 each sub-frame located on each side of the rectangular diffuser film 414. The tensioned optical diffuser film 414 is self-supporting. The other optical films 434, 435, and 436 are also constrained by the sub-frame 413 via a pin 416 which protrudes through the films via slots 426 cut into each film. Each slot can either be cut as a tight tolerance fit so as to cause a tensile force to be applied to the particular film or can be cut as a oversized slot such that the film is constrained by the sub-frame yet no tensile force is applied. The optical element 400 of FIG. 4 can be used in place of the diffuser plate and the optional optical films of conventional LCD displays.

Figure 5:
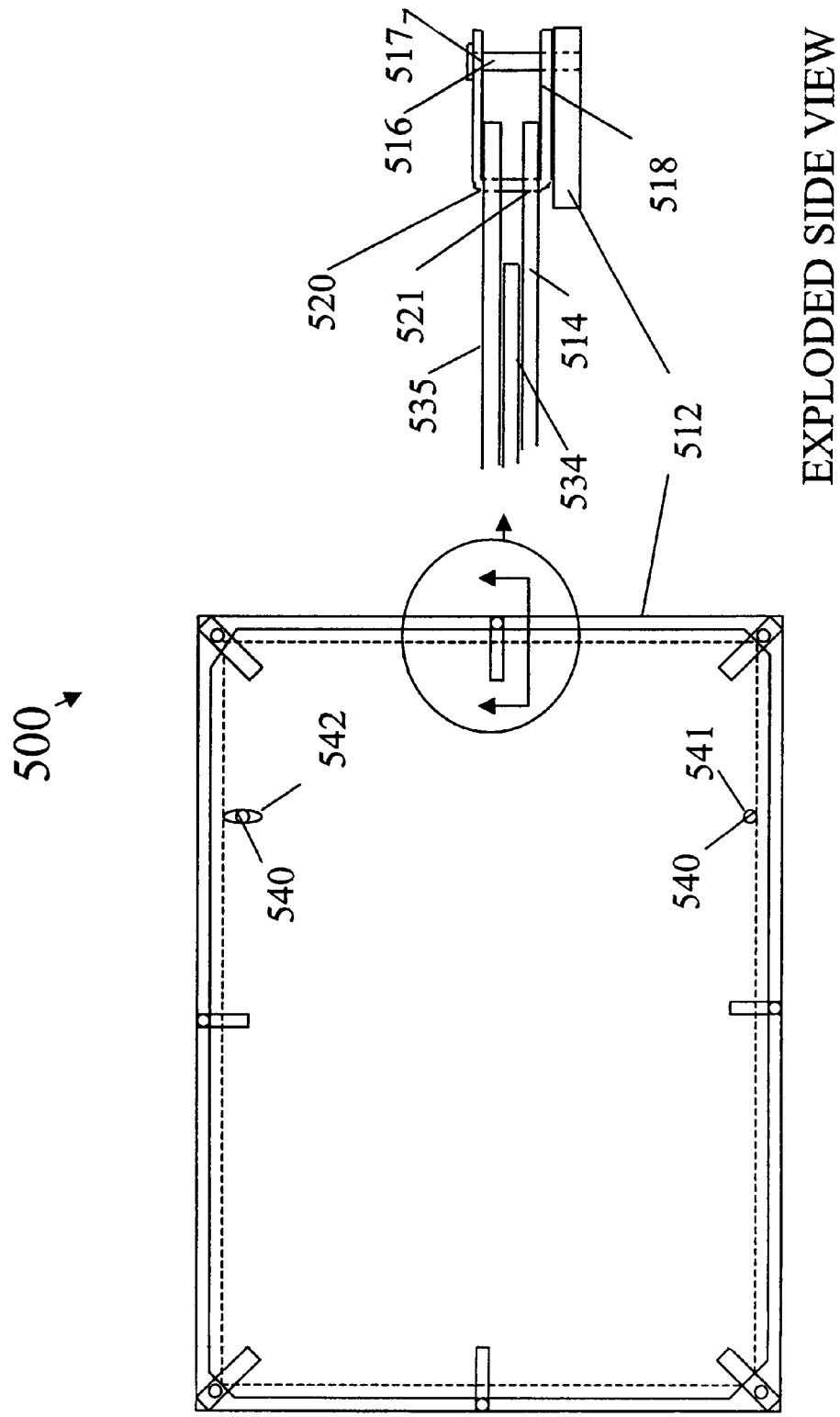
FIG. 5 schematically illustrates an optical element comprising an optical diffuser film, which is supported by a controlled tensile force via tensioned straps connected to a frame around the perimeter of the film according to principles of the present invention. Also, a light directing film is constrained by the straps with a bead coated collimating diffuser film inserted between the two tensioned films such that the optical element is a unitary component that comprises the entire light management film arrangement for an LCD display.

Another exemplary embodiment of the present invention is schematically illustrated in FIG. 5. The optical element 500 is an arrangement of light management films which includes a polymeric optical diffuser film 514 and a supporting frame 512 located around the perimeter of the film. The frame 512 can be a separate entity that is provided to the producers of LCD's along with the films or can be the existing frame in a conventional LCD backlight. Other optical films are also added to the arrangement of light management layers above the polymeric optical diffuser film. A bead coated collimation diffuser film 534 is placed adjacent to the polymeric optical diffuser film 514. A light directing film 535 is placed adjacent to the bead coated collimation diffuser film 534, opposite the optical diffuser film 514. FIG. 5 shows an alternative means by which the optical diffuser film 514 is supported by a tensile force. In this means the light directing film 535 is also supported by a tensile force. Tensioned strap 518 protrudes through slots 520 and 521 in both the optical diffuser film 514 and the light directing film 535, respectively. The tensioned strap can comprise any elastic material. Preferred materials are elastomers. Preferred elastomers are those that maintain performance for the life when used in an LCD under design temperatures of 85 C. Such elastomers include crosslinked: Polyurethanes, Silicone rubbers, Polychloroprene, Ethylene-propylene copolymer, Ethylene-propylene terpolymer, Vinylidene fluoride-chloro-trifluoro ethylene random copolymer, Vinylidene fluoride-chloro-hexa fluoro ethylene random copolymer, High-Strength Buna-N Rubber, and others. These elastomers may be reinforced with inorganic fillers such as talc, glass fibers, and other well known elastomer reinforcing additives. The use of stabilizers and environmental protective agents, such as antioxidants and UV stabilizers, in these elastomers is commonly known and can be used to further improve the performance over the life of an LCD. A pin 516 protrudes through holes 517 in each end of the tensioned strap. The pin 516 is fixed into the frame 512 located around the perimeter of the films. At least 4 such tensioned straps and pins as 518 and 516, respectively, are located around the perimeter of the films. The tensioned optical diffuser film 514 and light directing film 535 are self-supporting. The other optical film, the bead coated collimating film 534 is constrained normal to its surface by the two tensioned films which it is sandwiched between. Other optical films can also be constrained normal to their surfaces if placed between the two tensioned films. In order to constrain the bead coated collimating film 534 in the in plane directions, pins 540 are inserted into frame 512 through both a hole 541 and a slot 542 in the film 534. These pins could protrude through any other optical films placed between the two tensioned films as well. The pinned hole 541 prevents the film from translational movement of film 534. The pinned slot 542 prevents rotation of film 534 while allowing thermal expansion in the slot's elongated direction. The optical element 500 of FIG. 5 can be used in place of the diffuser plate and the optional optical films of conventional LCD displays.

Figure 6:
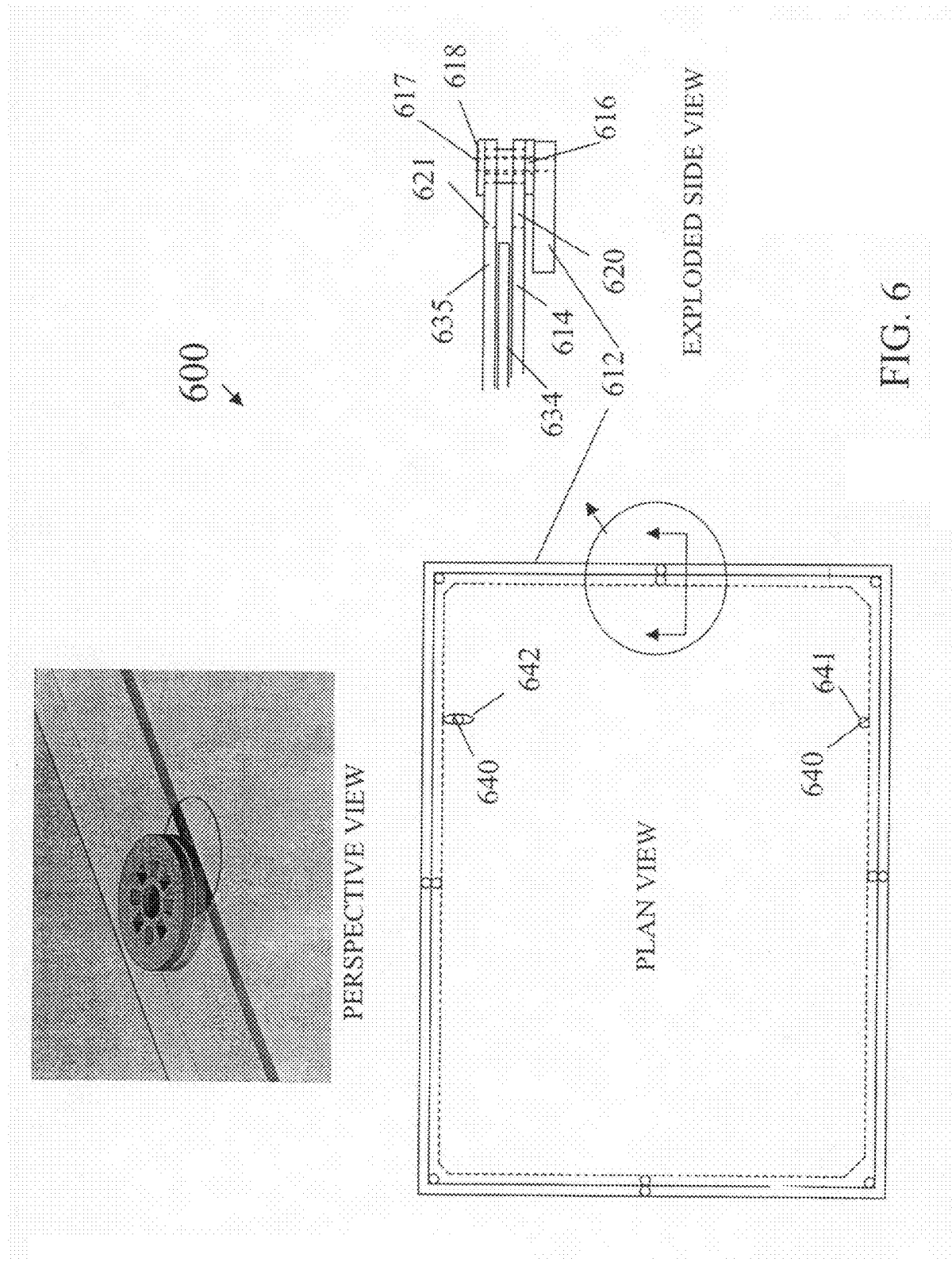
FIG. 6 schematically illustrates an optical element comprising an optical diffuser film, which is supported by a controlled tensile force via tensioned grommets connected to a frame around the perimeter of the film according to principles of the present invention. Also, a light directing film is constrained by the grommets with a bead coated collimating diffuser film inserted between the two tensioned films such that the optical element is a unitary component that comprises the entire light management film arrangement for an LCD display.

Another exemplary embodiment of the present invention is schematically illustrated in FIG. 6. The optical element 600 is an arrangement of light management films which includes a polymeric optical diffuser film 614 and a supporting frame 612 located around the perimeter of the film. The frame 612 can be a separate entity that is provided to the producers of LCD's along with the films or can be the existing frame in a conventional LCD backlight. Other optical films are also added to the arrangement of light management layers above the polymeric optical diffuser film. A bead coated collimation diffuser film 634 is placed adjacent to the polymeric optical diffuser film 614. A light directing film 635 is placed adjacent to the bead coated collimation diffuser film 634, opposite the optical diffuser film 614. FIG. 5 shows an alternative means by which the optical diffuser film 614 is supported by a tensile force. In this means the light directing film 635 is also supported by a tensile force. Tensioned grommet 618 protrudes through slots 620 and 621 in both the optical diffuser film 614 and the light directing film 635, respectively. The tensioned grommet can comprise any elastic material. Preferred materials are elastomers. Preferred elastomers are those that maintain performance for the life when used in an LCD under design temperatures of 85 C. Such elastomers include crosslinked: Polyurethanes, Silicone rubbers, Polychloroprene, Ethylene-propylene copolymer, Ethylene-propylene terpolymer, Vinylidene fluoride-chloro-trifluoro ethylene random copolymer, Vinylidene fluoride-chloro-hexa fluoro ethylene random copolymer, High-Strength Buna-N Rubber, and others. These elastomers may be reinforced with inorganic fillers such as talc, glass fibers, and other well known elastomer reinforcing additives. The use of stabilizers and environmental protective agents, such as antioxidants and UV stabilizers, in these elastomers is commonly known and can be used to further improve the performance over the life of an LCD. A pin 616 protrudes through a hole 617 in the tensioned grommet. The pin 616 is fixed into the frame 612 located around the perimeter of the films. At least 4 such tensioned grommets and pins as 618 and 616, respectively, are located around the perimeter of the films. The tensioned optical diffuser film 614 and light directing film 635 are self-supporting. The other optical film, the bead coated collimating film 634 is constrained normal to its surface by the two tensioned films which it is sandwiched between. Other optical films can also be constrained normal to their surfaces if placed between the two tensioned films. In order to constrain the bead coated collimating film 634 in the in plane directions, pins 640 are inserted into frame 612 through both a hole 641 and a slot 642 in the film 634. These pins could protrude through any other optical films placed between the two tensioned films as well. The pinned hole 641 prevents the film from translational movement of film 634. The pinned slot 642 prevents rotation of film 634 while allowing thermal expansion in the slot's elongated direction. The optical element 600 of FIG. 6 can be used in place of the diffuser plate and the optional optical films of conventional LCD displays.

In any of the embodiments where more than one optical film is constrained by the frame, sub-frame, or the tensioned films (as in FIGS. 3 thru 6) typically none of the optical films are adhered to each other. There may be benefit for two optical films to be adhered to each other from a cost of manufacturing standpoint but typically one or more of the optical films are not adhered to each other.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the claims.

The entire contents of the patents and other publications referred to in this specification are incorporated herein by reference.

EXAMPLE

In order to demonstrate a preferred embodiment of the present invention a commercial LCD TV was procured. The TV chosen was a 32" Samsung LN-S3251D LCD TV. The LC panel was removed from the TV exposing the arrangement of light management films on the top of the backlight unit. Three 200 um thick bead coated collimation diffuser films were stacked over a 1.5 mm slab diffuser. These films and slab diffuser were removed and cut in half in a direction perpendicular to the length direction of the CCFL's which reside beneath the slab diffuser. A center supporting bar was installed in the backlight above and perpendicular to the CCFL's such that the top surface of the bar was flush with the top surface of the backlight. One set of the cut slab diffuser and three bead coated collimating diffuser films were placed over half the backlight utilizing the installed support bar to support the slab diffuser along the newly cut edge. The other half of the backlight unit, which still had exposed CCFL's, was next outfitted with a tensioned support arrangement as that shown in FIG. 5.

The bottom most film, as that shown in FIG. 5, was a voided polymeric optical diffuser film. This film was made by first melt compounding 1.7 um cross-linked PMMA microbeads into Polyethylene terephthalate (PET #7352 from Eastman Chemicals). The microbeads comprised 70% polymethylmethacrylate and 30% of a trimethylolpropane-triacrylate cross-linker. The microbeads were made by a limited coalescence process well know in the art. Both the Polyethylene terephthalate resin pellets and the microbeads were first dried at 165 C in a desiccant dryer for 24 hours. They were then fed into a 27 mm twin screw compounder with the beads being added at a 30% by wt. to the compounded blend. The extrudate from the compounder was fed through a water bath and then pelletized.

Next the compounded pellets and the more PET 7352 was dried at 165 C in a desiccant dryer for 24 hours. The PET pellets and the compounded pellets were dry blended with the compounded pellets making up 8% by wt. of the dry blend and the PET 92% wt. Then the blend was melted at 275° C. and fed by a plasticating screw extruder into an extrusion die manifold to produce a melt stream which was rapidly quenched on a chill roll after issuing from the die. By regulating the throughput of the extruder, it was possible to adjust the thickness of the resulting cast sheet. In this case the thickness of the cast sheet was approx. 750 μm. The cast sheet was first oriented in the machine direction by stretching at a ratio of 2.7 and a temperature of 110° C. This sheet was then oriented in the transverse direction in a tenter frame at a ratio of 3.4 and a temperature of 100° C. without tearing. The stretched sheet was then heat set at 220° C.

The final film thickness was approximately 100 μm. Small voids formed around most of the microbeads in the films upon stretching which resulted in very diffuse transmission of light through the film.

The center film used in the installation as shown in FIG. 5 was a commercial bead coated light collimating diffuser film, Opalus BS-042 from Keiwa inc.

The Top film used in the installation as shown in FIG. 5 was a commercial prismatic light directing film modified with a diffusive coating on the prismatic side of the film. The base film was e225 LCD brightness film from Eastman Kodak Company. The diffusive coating was WitcoBond W-320 (Crompton Corp.) at a coat weight of 215 mg/m$^2$.

The 3 films as just described were assembled into a tensioned frame design as that shown in FIG. 5. 8 elastic straps were used and were comprised of 750 um thick Polyurethane (McMaster-Carr #1446T41). The straps were cut 6 mm in width and tensioned to 650 grams. The tensioned support arrangement as described in FIG. 5 using the films described above was fastened to the backlight unit frame and the added center support around the periphery of the still exposed CCFL's using screws.

Figure 7:
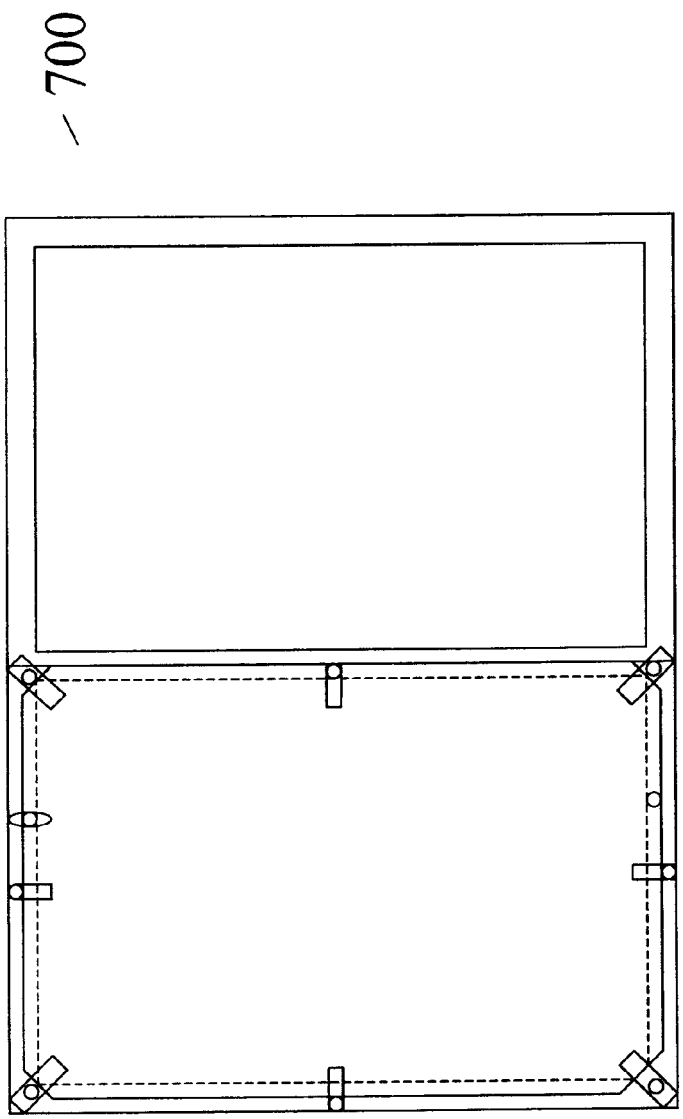
FIG. 7 schematically illustrates an LCD backlight which is outfitted on one half of the viewing area with the native arrangement of light management layers and on the other half of the viewing area with a set of optical films constrained using tensioned straps as in FIG. 5.

In this manner the backlight of the TV comprised ½ of the viewing area utilizing the light management layer arrangement that came with the native TV and ½ of the viewing area utilizing the tensioned support light management layer arrangement as that described in FIG. 5. FIG. 7 shows a plan view of the final assembly. The optical performance of the backlight only was then tested on both sides of the viewing area to compare the tensioned light management layers output to that of the native light management layers. Upon illuminating the CCFL's both sides of the backlight showed excellent uniformity with no visual perception of the CCFL's behind either arrangement of light management layers.

Measuring Equipment:

1.) ELDIM 160R EZ Contrast conscope—2 mm spot size with a 1.2 mm distance from sample.

The ELDIM 160R EZ Contrast conscope was used to determine the on-axis luminance and the 40 degree horizontal tilt luminance emitting from each arrangement of light management layers from the two sides of the backlight. On-axis luminance is the intensity of light emitting normal to the backlight and 40 degree horizontal tilt luminance is the intensity of light emitting from an axis tilted 40 deg from on-axis in a plane parallel to the axis of the CCFL's. Data was reported as the luminance in candela per square meter (cd/m$^2$). Table 1 shows the results of the measurements described above.

TABLE 1

| Configuration | Native Films | Tensioned Films |
|---|---|---|
| On-Axis Luminance (cd/m$^2$) | 5400 | 5500 |
| 40 deg. Luminance (cd/m$^2$) | 3200 | 3900 |

The backlight was then re-assembled along with the liquid crystal panel that came with the TV. Video content was played on the TV and the side of the TV with the tensioned films appeared brightener especially at viewing angles off-axis and near 40 degrees tilt. No non-uniformities in the viewing area were perceived in either side of the TV.

| Parts List | |
|---|---|
| 100 | direct-lit LC display device |
| 110 | backlight |
| 112 | reflector |
| 114 | light sources |
| 120 | light management layers |
| 122 | diffuser plate |
| 124 | collimating diffuser film |
| 126 | light directing film |
| 128 | reflective polarizer |
| 130 | front LC panel assembly |
| 132 | lower absorbing polarizer |
| 134 | panel plates |
| 136 | LC layer |
| 138 | upper absorbing polarizer |
| 139 | optional layer(s) |
| 140 | LC panel |
| 150 | controller |
| 200 | optical element |
| 212 | supporting frame |
| 214 | polymeric optical diffuser film |
| 216 | pin |
| 218 | spring |
| 220 | slot |
| 222 | shaft |
| 300 | optical element |
| 312 | supporting frame |
| 314 | polymeric optical diffuser film |
| 316 | pin |
| 318 | spring |
| 320 | slot |

| -continued | |
|---|---|
| Parts List | |
| 322 | shaft |
| 324 | pin |
| 326 | slot |
| 334 | collimated diffuser film |
| 335 | light directing film |
| 336 | reflective polarizer |
| 400 | optical element |
| 412 | supporting frame |
| 413 | subframe |
| 414 | polymeric optical diffuser film |
| 416 | pin |
| 418 | spring |
| 420 | slot |
| 422 | shaft |
| 423 | hole |
| 426 | slot |
| 434 | collimation diffuser film |
| 435 | light directing film |
| 436 | reflective polarizer |
| 500 | optical element |
| 512 | supporting frame |
| 514 | polymeric optical diffuser film |
| 516 | pin |
| 517 | hole in tensioned strap |
| 518 | tensioned strap |
| 520 | slot in light directing film |
| 521 | slot in polymeric optical diffuser film |
| 534 | collimation diffuser film |
| 535 | light directing film |
| 540 | pin |
| 541 | hole in collimation diffuser film |
| 542 | slot in collimation diffuser film |
| 600 | optical element |
| 612 | supporting frame |
| 614 | polymeric optical diffuser film |
| 616 | pin |
| 617 | hole in tensioned grommet |
| 618 | tensioned grommet |
| 620 | slot in polymeric optical diffuser film |
| 621 | slot in light directing film |
| 634 | collimation diffuser film |
| 635 | light directing film |
| 640 | pin |
| 641 | hole in collimation diffuser film |
| 642 | slot in collimation diffuser film |
| 700 | Test backlight unit |

The invention claimed is:

1. An optical element comprising at least one optical film wherein at least a portion of the optical film is maintained dimensionally stable by the presence of a mechanism for application of a controlled tensile force to the film wherein the tensile force is applied through a tensioning mechanism protruding through holes or slots in the optical film.

2. The optical element of claim 1 wherein the tensile force is applied by mechanisms at various locations around the perimeter of the optical film.

3. The optical element of claim 1 wherein the tensioning mechanism comprises an elongated structure which protrudes through the holes or slots and has at least one surface that is normal to the direction of the tensile force.

4. The optical element of claim 1 wherein the tensile force can be substantially maintained for each mechanism over the expected film dimensional change for the design temperature and humidity range of the optical element.

5. The optical element of claim 1 wherein the tensioning mechanism comprises an tensioning grommet protruding through holes or slots in the optical film.

* * * * *